(12) United States Patent
Reich

(10) Patent No.: US 9,400,184 B2
(45) Date of Patent: Jul. 26, 2016

(54) METHOD FOR PREPARING AND DISPLAYING TIMETABLE INFORMATION

(71) Applicant: LAWO Informationssysteme GmbH, Rastatt (DE)

(72) Inventor: Hans-Joachim Reich, Karlsruhe (DE)

(73) Assignee: LAWO Informationssysteme GmbH, Rastatt (DE)

( * ) Notice: Subject to any disclaimer, the term of this patent is extended or adjusted under 35 U.S.C. 154(b) by 0 days.

(21) Appl. No.: 14/617,253

(22) Filed: Feb. 9, 2015

(65) Prior Publication Data

US 2015/0153192 A1    Jun. 4, 2015

Related U.S. Application Data

(63) Continuation of application No. PCT/EP2013/066853, filed on Aug. 13, 2013.

(30) Foreign Application Priority Data

Aug. 15, 2012    (DE) .......................... 10 2012 016 119

(51) Int. Cl.
| | | |
|---|---|---|
| *G08G 1/005* | (2006.01) | |
| *G08G 1/123* | (2006.01) | |
| *G08G 1/133* | (2006.01) | |
| *G01C 21/20* | (2006.01) | |
| *G01C 21/34* | (2006.01) | |
| *G01C 21/36* | (2006.01) | |
| *H04W 4/02* | (2009.01) | |

(52) U.S. Cl.
CPC ................ *G01C 21/34* (2013.01); *G01C 21/20* (2013.01); *G01C 21/3655* (2013.01); *G08G 1/005* (2013.01); *G08G 1/123* (2013.01); *G08G 1/133* (2013.01); *H04W 4/021* (2013.01)

(58) Field of Classification Search
CPC ....... G08G 1/005; G08G 1/133; G08G 1/123; G01C 21/34; H04W 4/021
USPC .......... 701/465, 527, 533; 104/18; 455/456.1, 455/456.3
See application file for complete search history.

(56) References Cited

U.S. PATENT DOCUMENTS

| | | | |
|---|---|---|---|
| 8,169,342 B1 | 5/2012 | Barbeau | |
| 2003/0137435 A1* | 7/2003 | Haddad et al. ................. | 340/994 |
| 2004/0135704 A1* | 7/2004 | Fischer .................. | G01C 21/20 |
| | | | 340/994 |

(Continued)

FOREIGN PATENT DOCUMENTS

| | | |
|---|---|---|
| CA | 2461414 A1 | 1/2003 |
| DE | 10119244 A1 | 1/2003 |

(Continued)

OTHER PUBLICATIONS

International Search Report dated Nov. 11, 2013, 9 pages.

(Continued)

*Primary Examiner* — Russell Frejd
(74) *Attorney, Agent, or Firm* — Reising Ethington, P.C.

(57) ABSTRACT

The invention relates to a method for conditioning and displaying timetable information in a transport network that has a plurality of stops for scheduled means of transport. The approach of a portable appliance to a stop is sensed on the basis of position-dependent data from the portable appliance. At least one future departure time of a scheduled means of transport at the stop is ascertained. The departure time is output on the portable appliance.

20 Claims, 4 Drawing Sheets

(56) References Cited

U.S. PATENT DOCUMENTS

| | | |
|---|---|---|
| 2007/0197231 A1 | 8/2007 | Lin |
| 2010/0088026 A1 | 4/2010 | Manolescu |
| 2010/0153004 A1* | 6/2010 | Natsume ................. 701/201 |
| 2012/0170560 A1* | 7/2012 | Han .................. G01S 5/0252 370/338 |

FOREIGN PATENT DOCUMENTS

| | | |
|---|---|---|
| DE | 60320237 T2 | 5/2009 |
| DE | 102008017392 A1 | 10/2009 |
| EP | 0767948 A1 | 4/1997 |
| EP | 1251475 A2 | 10/2002 |
| EP | 1274057 A1 | 1/2003 |
| WO | WO9600960 A1 | 1/1996 |
| WO | WO03069576 A1 | 8/2003 |

OTHER PUBLICATIONS

German Examination Report dated Jul. 4, 2013, 2 pages.

English Translation of the International Search Report dated Feb. 26, 2015, 9 pages.

* cited by examiner

METHOD FOR PREPARING AND DISPLAYING TIMETABLE INFORMATION

CROSS REFERENCES TO RELATED APPLICATIONS

This application is a Continuation application of international patent application PCT/EP2013/066853, filed Aug. 13, 2013, which claims the priority of German patent application DE 10 2012 016 119.0, filed Aug. 15, 2012.

BACKGROUND OF THE INVENTION

The present invention relates to a method for conditioning and displaying timetable information in a transport network that has a plurality of stops for scheduled means of transport.

Such methods are usually based on the provision of timetable information at various locations along the routes of travel of the public means of transport. This can be effected by means of platform displays, bus stop displays or else by means of loudspeaker announcements, for example.

By way of example, DE 603 20 237 discloses a method for determining an arrival time of a vehicle at one or more positions along the route of travel for the vehicle, in which the vehicle periodically transmits signals when the vehicle has reached a particular position. An arrival time at one or more of the positions along the route of travel is then determined. Finally, these arrival times are transmitted to reception units at various points along the vehicle route, such as in businesses, households or schools. This is intended to allow more accurate prediction of the arrival time of the vehicle, e.g. a school bus.

However, the timetable information in this case is output only at fixed, predefined locations along the routes of travel of the public means of transport. Particularly for passengers who are staying in a strange city, for example, and who wish to use public means of transport to get to a particular destination, the problem arises that it is first of all necessary to identify where the next stop for a public means of transport that is going to the desired destination is located. There may even be multiple alternative stops available for going to the desired destination. In this case, the choice of the appropriate stop is dependent on the future departure times of the relevant public means of transport at these stops, for example.

It would therefore be desirable if the timetable information could be transmitted directly to the location of the passenger. This would mean that it is not necessary to go to the various stops in order to ascertain the best service to the destination. At any rate, the passenger would be able to do this only within a very small radius.

The very widespread nature of mobile data appliances or mobile telephones means that the timetable information can be transmitted to the passenger directly using these appliances, for example.

Already known methods for retrieving timetable information on mobile appliances of this kind require specific knowledge for operating the relevant software programs. By way of example, the passenger often needs to find his way around confusing menus for the various timetable information. Navigation through the complicated menu structures using scrollbars and dropdown list boxes is very laborious, particularly on the mobile appliances with their small displays. Furthermore, the web pages of the providers of the local public transport differ from city to city, usually considerably. Hence, a very large amount of time is taken before the departure times of the public means of transport at suitable surrounding stops can be ascertained.

DE 10 2008 017 392 discloses a method for querying timetable information in which the mobile telephone is first of all used to input character strings that are transmitted to a central memory unit. The character or numerical sequences are analyzed and conditioned using what are known as character string filters. The analysis is used to derive specific timetable queries from the character or numerical sequences. By way of example, the numerical sequence "030-040" results in a query for the timetable information from Berlin to Hamburg. The result obtained from the query is then transmitted to the mobile telephone.

In this case too, however, specific knowledge is required for correctly generating the corresponding character strings, which in turn makes querying the timetable information difficult. Furthermore, this method also provides no assistance for identifying the location of a suitable stop nearby that provides a connection to the desired destination.

SUMMARY OF THE INVENTION

Against this background, it is the object of the present invention to specify a method that is technically simple to apply and hence easily comprehensible that can be used by a user of public means of transport to query a piece of up-to-date timetable information in his surroundings.

The invention achieves the above object by means of a method of the type cited at the outset, wherein first of all the approach of a portable appliance to a stop is sensed on the basis of position-dependent data from the portable appliance, wherein at least one future departure time of a scheduled means of transport at the stop is ascertained and wherein the departure time is output on the portable appliance.

Within the context of the present invention, position-dependent data are intended to be understood to mean data that are used to determine the location of the portable appliance.

Examples of scheduled means of transport that may be cited are buses, trams, underground trains and overground trains.

By way of example, the portable appliance may be a mobile telephone, a mobile telephone with additional computer functionality and connectivity (what is known as a smartphone), a PDA (personal digital assistant), a tablet computer or a laptop.

According to the invention, the approach of the portable appliance to a stop is sensed on the basis of the location of the portable appliance. Hence, this method step is automated. Manual input of a stop name or else selection of a stop in a complex menu structure is not necessary. Furthermore, the up-to-date location information from the portable appliance is automatically used in the selection of the available public means of transport. It is therefore not necessary for the user of the portable appliance to orient himself on the basis of road names in the vicinity, for example, in order to determine his own position. This allows very simple and fast querying of the timetable information.

In line with the method according to the invention, the departure times of a plurality of scheduled means of transport at the relevant stop can also be ascertained and output on the portable appliance. In addition, the names and/or the arrival times of the scheduled means of transport at the stop can also be ascertained and output.

In a further embodiment of the method, the departure times of a plurality of scheduled means of transport at a variety of stops that the user of the portable appliance is approaching can also be output.

In this context, all information can be output on the portable appliance visually and/or audibly.

It is particularly preferred if the carriage of the portable appliance on a scheduled means of transport is sensed on the basis of the position-dependent data from the portable appliance, at least one connection to another scheduled means of transport at the stop that the portable appliance is approaching is ascertained and the connection is output on the portable appliance. The phrase ". . . the carriage of the portable appliance on a scheduled means of transport," as well as variations thereof, refers to the carrying or transporting of a portable appliance by a means of transport or other transport device; that is, the presence of a portable appliance on a means of transport or other transport device.

As a result, it is not necessary to input a number or a name for the scheduled means of transport. Tracking of the position-dependent data from the portable appliance can be used to automatically determine whether the portable appliance is being carried on a scheduled means of transport. Hence, the position-dependent connections can be output on the portable appliance visually and/or audibly essentially without any time involvement for the user. This substantially simplifies handling of timetable information.

According to a further embodiment, the ascertainment of the at least one future departure time and the output of the departure time on the portable appliance are effected automatically as soon as the approach of the portable appliance to the stop is sensed.

This measure automatically ascertains a departure time and outputs it on the portable appliance as soon as the portable appliance approaches a stop. Time-consuming interactions between the user and the portable appliance are therefore no longer necessary. The timetable information can therefore be retrieved without difficulty even by technically inexperienced users.

In a further embodiment, the ascertainment of the at least one connection and the output of the connection on the portable appliance are effected automatically as soon as the carriage of the portable appliance on the scheduled means of transport is sensed.

In this case, the connection comprises data such as the name or the number of the scheduled means of transport, the departure time and/or the location of the stop at which the connecting scheduled means of transport can be used. The automated highlighting of connections means that no further input by the user is necessary in order to retrieve the timetable information.

According to a further embodiment, the sensing of the approach of the portable appliance to the stop and/or the sensing of the carriage of the portable appliance on the scheduled means of transport is/are effected on the portable appliance.

By way of example, a software application (what is known as an app) can be started on a smartphone. Said software application uses the position-related data to monitor whether the smartphone approaches a stop and/or whether the smartphone is carried on a scheduled means of transport. In this case, the pure position computation for the smartphone can be carried out using terminal-based or network-based locating methods. In this embodiment, however, the smartphone/portable appliance evaluates whether the smartphone is approaching a stop, for example.

In a further embodiment, the ascertainment of the at least one future departure time and/or the ascertainment of the at least one connection is/are started by means of the portable appliance.

As soon as an approach by the smartphone to a stop is detected by means of an app, for example, the timetable information is retrieved and is output on the smartphone. This corresponds to what is known as the "pull principle". The retrieval of the timetable information can be effected automatically or else only after confirmation by the user of the smartphone.

According to a further embodiment, the sensing of the approach of the portable appliance to the stop and/or the sensing of the carriage of the portable appliance on the scheduled means of transport is/are effected on a data processing unit from which position data from at least one portion of the transport network are accessible.

By way of example, the data processing unit may be a central computer in a control center, which central computer takes the position-related data from the portable appliance as a basis for evaluating whether the portable appliance is approaching one or more stops, for example. In this case, the pure ascertainment of the appliance positions can again be performed using terminal-based or network-based locating.

In a further embodiment, the ascertainment of the at least one future departure time and/or the ascertainment of the at least one connection is/are started by the data processing unit.

As soon as the data processing unit establishes an approach by the portable appliance to a stop, for example, the data processing unit starts the ascertainment of the corresponding departure times/connections. The ascertainment of these data can be executed by the data processing unit itself or else by any other computation unit within the management system of the transport network. The ascertained data are then output on the portable appliance (what is known as the "push principle").

According to a further embodiment, the portable appliance is registered on the data processing unit.

Advantageously, the portable appliance is registered with the data processing unit for the timetable information service (transmission of departure times and/or connections to the portable appliance) in advance. Hence, the user of the portable appliance can selectively set when and where he wishes to have such information delivered.

In a further embodiment, the approach of the portable appliance to the stop is sensed as soon as there is less than a defined maximum distance between the portable appliance and the stop.

In other words, this measure is used to define a capture radius around the stop. If the user of the portable appliance is within the capture radius or the defined maximum distance, this is rated as approaching the relevant stop. The departure times/connections are ascertained and are output on the portable appliance. For the purpose of personalization, the maximum distance/capture radius can be stipulated individually, for example. Furthermore, the capture radius can also be defined on the basis of the type of stop. By way of example, it is thus possible for a smaller capture radius to be stipulated for bus stops than for railway stations.

According to a further embodiment, a destination is first of all input into the portable appliance, then itinerary data are ascertained that have at least one piece of interchange advice, a name of a destination stop and/or a scheduled arrival time at the destination stop, and finally the itinerary data are output on the portable appliance.

This allows the user of the portable appliance to display a journey route to a desired destination. This merely requires the name of the destination, for example, to be input in the portable appliance. The starting point for the journey route is ascertained by the portable appliance or a computation unit within the associated management system independently on the basis of the position-dependent data from the portable appliance. Optionally, it is also possible for a plurality of alternative routes to be output. Alternatively, preset preferences for the user (fast route, least expensive route, short walk, etc.) can also be taken as a basis for outputting just the best suited route.

In a further embodiment, the portable appliance uses a wireless network to access timetable information that is stored at least to some extent in a central memory unit and/or at least to some extent in a plurality of local memory units.

This measure means that the timetable information, which is updated constantly on the basis of the current traffic situation, for example, is stored on a central memory unit in the control center and/or on local memory units at the stops, for example. Alternatively, the timetable information can also be provided by a central memory unit of a relevant service provider. Hence, the portable appliance can always access the up-to-date timetable information. If a scheduled means of transport is late, the user can sidestep to another stop or to another scheduled means of transport, for example. If the timetable information is stored on the central memory unit of the control center and on local memory units of the various stops, this allows data redundancy to be attained. This ensures that the portable appliance can access the timetable information even if one of the memory units fails or is unavailable.

According to a further embodiment, the portable appliance is used to store timetable information with the departure times of at least one scheduled means of transport at a plurality of stops.

If the timetable information is stored on a local memory of the portable appliance, the user can also access timetable data when, in an underground railway station, for example, it is not possible to set up a connection to the central/local memory units of the management system or of the service provider. This allows what is known as an "offline mode" of the portable appliance. In this case, the timetable information can be loaded from the central/local memory units onto the portable appliance at a time selected by the user or else at preset intervals.

In a further embodiment, the position-dependent data from the portable appliance are ascertained using a transport-network-specific positioning system, using a global satellite navigation system and/or using a mobile radio network.

Many diverse options can be used for locating the portable appliance. By way of example, location determination can thus be performed using the GPS (Global Positioning System) or the GSM (Global System for Mobile Communications) network. If an appropriate radio link to these systems is not possible, it is also possible for the portable appliance to be located using WLAN, Bluetooth or RFID (Radio Frequency Identification). Furthermore, further transport-network-specific solutions can also be chosen that are suited to associating the user with a particular scheduled means of transport, for example (e.g. light barriers on the doors of a bus with additional identification). In addition, it is also possible for a plurality of location technologies to be used in parallel in order to increase positioning accuracy. The use of a plurality of technologies additionally allows optimization of the computation time for locating the portable appliance.

In a further embodiment, the position-dependent data from the portable appliance are ascertained using near field communication and/or timetable information is transmitted to the portable appliance using the near field communication.

The NFC (Near Field Communication) method is a further option for determining the location of the portable appliance. Particularly in areas of application in which GPS reception is disrupted or unavailable (e.g. underground trains), position determination is made possible by means of NFC. At the same time, NFC ensures exact determination of the location of the portable appliance, e.g. in the region of railway stations with a plurality of stops in a small space. Furthermore, NFC can be used in order to transmit the timetable information to the portable appliance.

It goes without saying that the features cited above and those yet to be explained below can be used not only in the respectively indicated combination but also in other combinations or on their own without departing from the scope of the invention.

BRIEF DESCRIPTION OF THE DRAWINGS

Exemplary embodiments of the invention are represented in the drawings and are explained in more detail in the following description. In the drawings.

DESCRIPTION OF PREFERRED EMBODIMENTS

Figure 1:
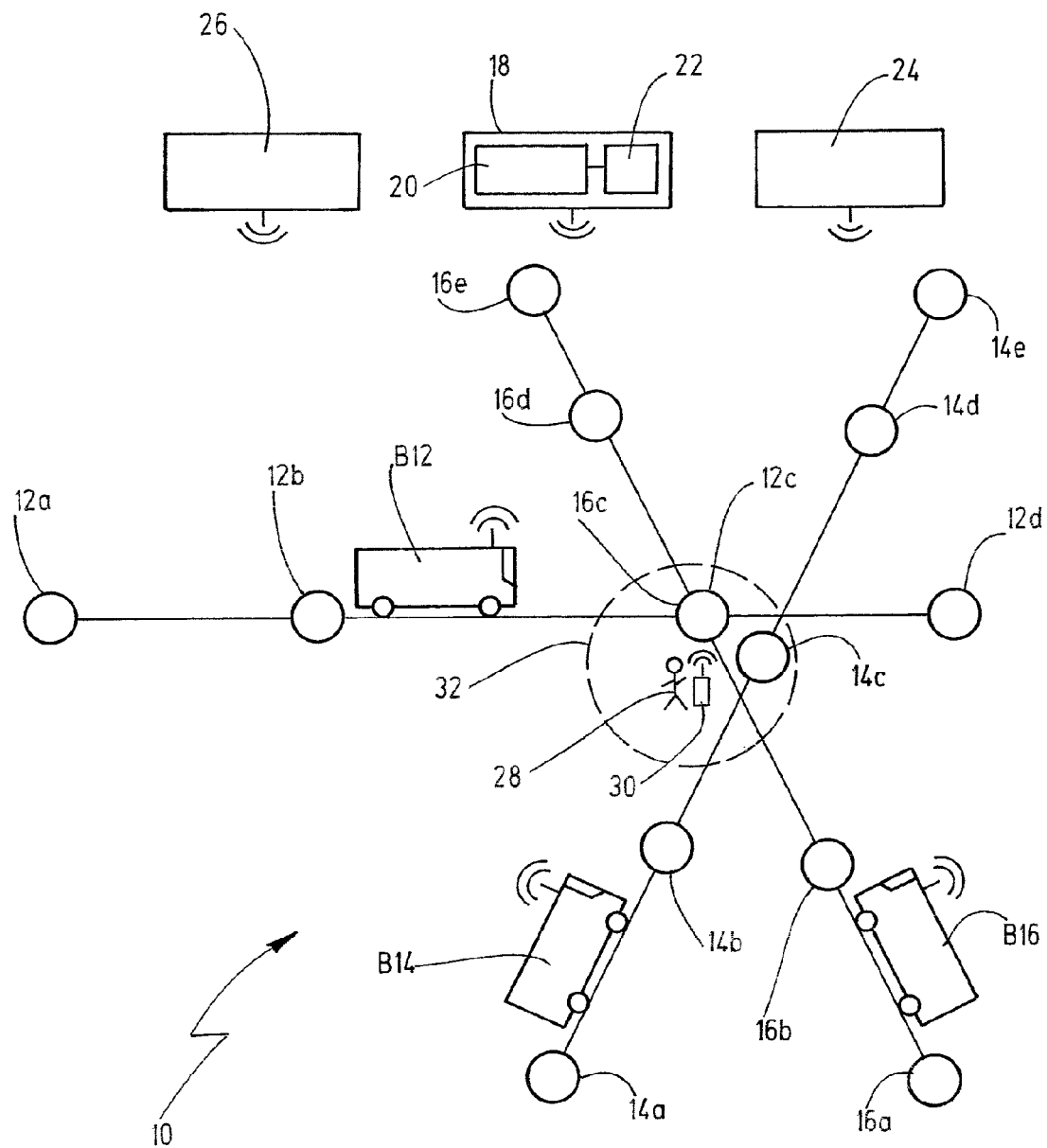
FIG. 1 schematically shows a transport network with a plurality of stops for scheduled means of transport in order to explain an embodiment of a method according to the invention.

FIG. 1 shows a transport network 10 with a plurality of stops 12, 14, 16. In this case, the stops 12a to 12d denote a bus route for the local public transport that is used by a bus B12. Accordingly, the stops 14a to 14e mark the route of a bus B14 and the stops 16a to 16e mark the route of a bus B16.

For coordination and for the purpose of controlling the operation of the scheduled means of transport, in the present case the buses B12, B14, B16, a control center 18 is used. The control center 18 has at least one data processing unit 20 and a central memory 22. The central memory 22 is used to store a piece of timetable information for the transport network 10, inter alia. Alternatively or in addition, the timetable information can be stored in local memory units that are associated with the stops 12, 14 and 16, for example. The additional storage of the timetable information in local memory units and the associated data redundancy allow an increase in the fail safety of the management system. In a further alternative embodiment, the timetable information may also be stored on a central memory unit of a service provider.

The control center 18 is in radio contact with the buses B12, B14 and B16. For the radio link, it is possible to use analog professional mobile radio and trunked mobile radio systems or else digital radio systems (e.g. Tetra or Tetrapol). Alternatively, it is also possible for a public mobile radio network 24 (e.g. GSM, LTE) to be used for the communication between the control center 18 and the buses B12, B14, B16.

Particularly advantageously, the timetable information stored in the central memory 22 is constantly matched to the current traffic situation. If the bus B12 gets into a queue, for example, the relevant timetable information can be updated directly and then output to the subsequent stops 12c and 12d. To this end, the scheduled means of transport B12, B14, B16 determine their location on the basis of a global satellite navigation system 26 (e.g. GPS), for example. Alternatively, the location of the buses B12, B14, B16 can also be determined using the mobile radio network 24. A further locating variant for the scheduled means of transport B12, B14, B16 is logical locating. This involves just the distance covered by the bus B12 (measured from the starting stop 12a) being transmitted to the control center 18, for example. It may additionally be possible for there to be a comparison against the stops to which the bus has gone (detection of door opening). This variant is more uncertain than physical locating by means of the global satellite navigation system 26. However, fewer data need to be transmitted to the control center 18 than in the case of physical locating. The data processing unit 20 then compares the transmitted location data from the scheduled means of transport B12, B14, B16 with what are known as plan data (location data from the scheduled means of transport in the event of travel according to plan) in order to determine the current timetable discrepancy for the scheduled means of transport B12, B14, B16. An updated piece of timetable information is derived therefrom and stored in the central memory 22.

It will now be assumed that a user 28 who wishes to use one of the scheduled means of transport B12, B14, B16 is in a region of the transport network 10. Furthermore, it will be assumed that the user 28 is carrying a portable appliance 30, in the present case a smartphone 30, with him. Since the user 28 is nonlocal, for example, he does not know the location of the closest stops 12, 14, 16. For this reason, the user 28 uses his smartphone 30 and starts a software program, what is known as an app, thereon. The app uses the mobile radio network 24 to set up a data connection to the control center 18 in order to retrieve the closest stops 12, 14, 16 and the associated timetable information. In order to identify the closest stops 12, 14, 16, it is first of all necessary to determine the location of the smartphone 30. To this end, the control center 18 sends a location query to the mobile radio network 24, for example. The mobile radio network 24 locates the smartphone 30 on the basis of the current mobile radio cell being used and any additional signal data from the smartphone 30 that are available in the mobile radio network 24. The ascertained location information from the smartphone 30 is returned to the control center 18 by the mobile radio network 24. The control center 18 then compares the ascertained location information from the smartphone 30 with coordinates for the stops 12, 14, 16. In order to narrow down the stops 12, 14, 16, a maximum distance 32 is used that is either defined by means of the user 28 and stored on the smartphone 30 or that is stored in the control center 18. In other words, the maximum distance 32 defines a capture radius for stops 12, 14, 16 in the region of the smartphone 30. In the present example, the approach by the smartphone 30 to the stops 12c/16c and 14c is therefore sensed. The control center 18 then uses the updated timetable data stored in the central memory 22 to ascertain the timetable information for the stops 12c/16c and 14c. By way of example, the timetable information may comprise the arrival times, the departure times, the destination stops and/or the names or numbers of the scheduled means of transport B12, B14, B16. In addition, the control center 18 can transmit the coordinates of the stops 12c/16c and 14c to the smartphone 30. This allows the user 28 to head for one of the stops 12c/16c or 14c in a purposeful manner using a navigation system.

In the case of the example that has just been outlined, what is known as the pull principle is used, i.e. the user 28 explicitly requests the timetable information from the control center 18 by starting the app on the smartphone 30. Alternatively, however, the timetable information can also be transmitted to the smartphone 30 on the basis of what is known as the push principle. In this alternative exemplary embodiment, the user 28 uses his smartphone 30 to register at the control center 18 for a timetable information service that transmits timetable information to the smartphone 30 as soon as the smartphone 30 approaches a stop 12, 14, 16. In this case, the approach of the smartphone 30 to a stop 12, 14, 16 can be defined in a manner equivalent to that in the previous example, in which an approach is detected as soon as there is less than the maximum distance 32 between the smartphone 30 and one of the stops 12, 14, 16. Checking of this maximum distance 32 again requires the smartphone 30 to be located. By way of example, the smartphone 30 can ascertain its current location using the global satellite navigation system 26 (e.g. GPS). This location information is then transmitted to the control center 18 by the smartphone 30 using the mobile radio network 24. The control center 18 then compares the location information received with the coordinates of the stops 12, 14, 16. As soon as one of the stops 12, 14, 16 is within the capture radius of the smartphone 30, the associated timetable information (which may possibly also comprise the timetable information for a plurality of scheduled means of transport B12, B14, B16) is transmitted to the smartphone 30. Hence, in this example, the user 28 needs to register for the timetable information service only once. He then receives the timetable information for the stops 12, 14, 16 nearby automatically without further interaction. This allows very simple use of the public means of transport. An involved time-intensive search for the timetable information is not necessary. Furthermore, the user 28 receives a constantly updated piece of timetable information that matches the current traffic situation in the transport network 10.

In order to explain a further embodiment of the method, FIG. 2 again shows the transport network 10. In terms of their design and their workings, the elements shown in FIG. 2 generally correspond to the elements shown in FIG. 1 and are therefore denoted by the same reference symbols. The differences are essentially explained below.

In this exemplary embodiment, it will be assumed that the user 28 is a passenger on the bus B12. As in the previous example, the user 28 is carrying the smartphone 30 with him. The user 28 may be interested in connections, since he wishes to get to a destination that the bus B12 does not go to. Consequently, the user 28 starts an app on the smartphone 30 in order to retrieve timetable information. Automatically or at the request of the user 28, the app uses the mobile radio network 24 to set up a data connection to the control center 18. This data connection is used by the smartphone 30 to send a request for timetable information to the control center 18. Furthermore, the smartphone 30 sets up a radio link to the global satellite navigation system 26 after the app is started. Using the global satellite navigation system 26, the smartphone 30 ascertains the up-to-date location information and sends it to the control center 18, likewise via the mobile radio network 24. The data processing unit 20 of the control center 18 then compares the location information from the smartphone 30 with the coordinates of the stops 12, 14, 16 and the coordinates of the routes of travel of the scheduled means of transport B12, B14, B16. As a result of this comparison, the data processing unit 20 senses that the smartphone 30 is being carried on the bus 12. Consequently, the data processing unit 20 ascertains the next stop to which the bus B12 goes (in the present example the stop 12c/16c). The data processing unit 20 then checks whether scheduled means of transport with another destination go to this stop 12c/16c. In the present example, the bus B16 with the terminal stop 16e also goes to the stop 12c/16c. On the basis of this, the data processing unit 20 ascertains the timetable information for the bus B16 at the stop 12c/16c from the central memory 22. The timetable information may comprise an arrival time, a departure time and/or a name or a number, including the terminal stop of the bus B16. This timetable information is sent to the smartphone 30 by the data processing unit 20 via the mobile radio network 24 and output on said smartphone.

In addition, a radius around the closest stop 12c/16c to which the bus goes can be defined in which further connections are taken into account. If the stop 14c is only a few meters away from the stop 12c/16c, for example, then the bus B14 also provides a connection of interest to the user 28 if he wishes to go to the destination 14e. To this end, when ascertaining connections, the data processing unit 20 can also ascertain the timetable information for those stops that are within the defined radius around the closest stop 12c/16c to which the bus goes. Hence, the timetable information for the bus B14 is also displayed on the smartphone 30 in the present example.

The application of the smartphone 30 that is outlined above and the querying of the timetable information are oriented to the pull principle. In a similar manner to FIG. 1, the connections can also be transmitted to the smartphone 30 on the basis of the push principle. It is thus possible for the user 28 to use the mobile radio network 24 to register with a timetable information service of the control center 18 in advance. The timetable information service of the control center 18 then constantly tracks the position of the smartphone 30. By way of example, the position determination for the smartphone 30 can be effected by virtue of the control center 18 sending position requests to the mobile radio network 24, which locates the smartphone 30 via the mobile radio cell that is currently being used. The data processing unit 20 then compares the position data from the smartphone 30 with the coordinates of the stops 12, 14, 16 and the coordinates of the routes of travel of the buses B12, B14, B16. As a result, the carriage of the smartphone 30 on the bus B12 is sensed. The connections at the stops 12c/16c and 14c that the smartphone 30 is approaching are then ascertained and are transmitted to the smartphone 30 via the mobile radio network 24. The smartphone 30 is used to present the connections to the user 28 visually or else audibly.

Figure 3:
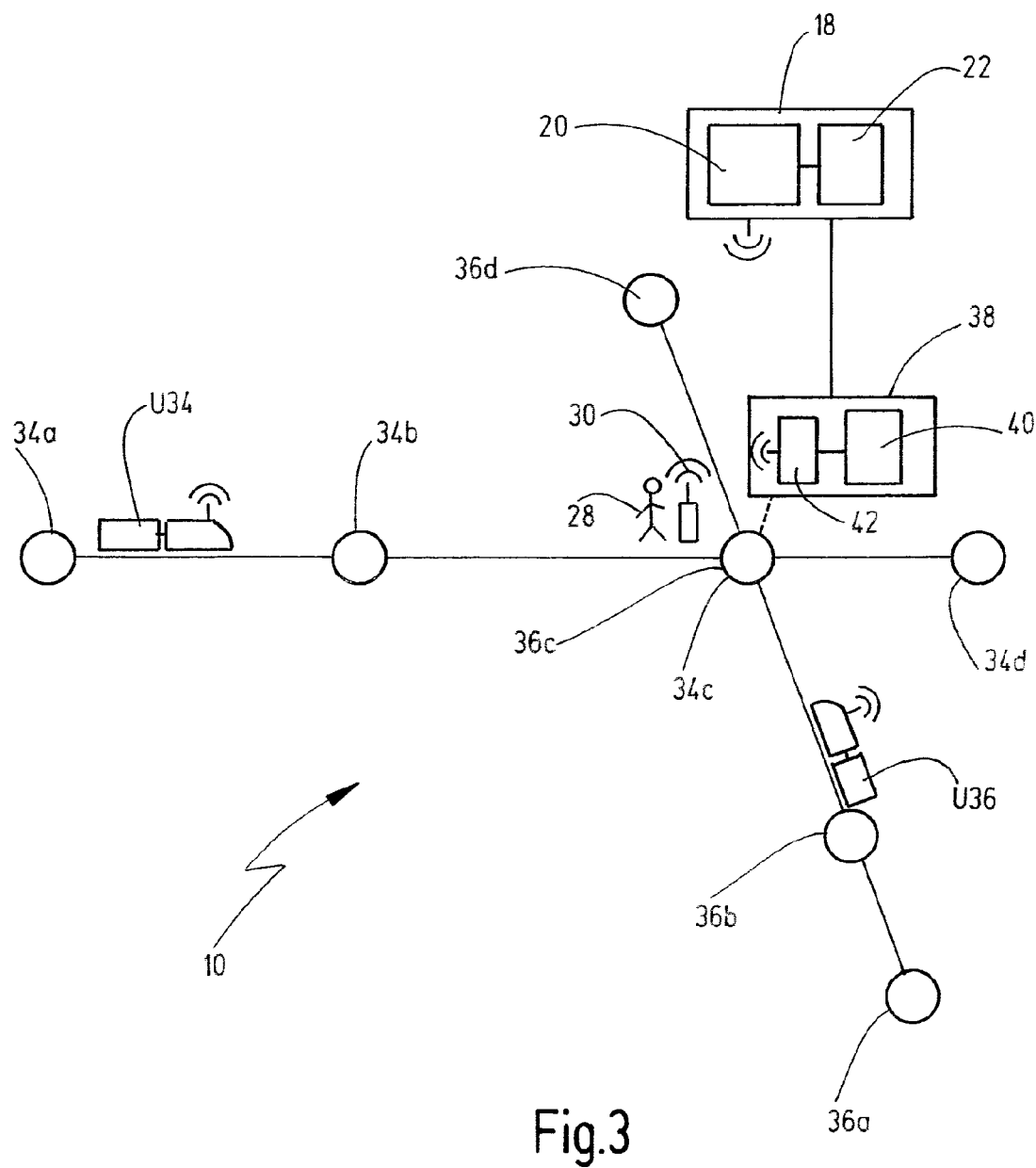
FIG. 3 shows the transport network in order to explain a further embodiment of the method according to the invention.

FIG. 3 shows the transport network 10 with two underground railway lines that are used by underground trains U34, U36. In this case, the underground train U34 travels to stops 34a to 34d and the underground train U36 travels to stops 36a to 36d. In a similar manner to the buses B12, B14, B16, the underground trains U34, U36 are in radio contact with the control center 18. For this, it is possible to use a transport-network-specific radio system, for example, which is also available in the tunnels used by the underground trains U34, U36. This radio contact can be used by the underground trains U34, U36 to transmit their location information, inter alia, to the control center 18. By way of example, the location information can be ascertained using location beacons (by means of infrared or inductively by means of coupling coils). This allows the timetable information stored in the central memory 22 to be constantly updated. Any timetable delays, e.g. on account of a very high volume of passengers, can be taken into account by the control center 18 for coordination of the underground train traffic. In this exemplary embodiment, the control center 18 has a communication link to a stop information unit 38 that is associated with the stop 34c/36c. The stop information unit 38 has a local memory unit 40 and a near field communication unit (NFC unit) 42. The timetable information that is relevant to the stop 34c/36c is additionally transmitted to the stop information unit 38 by the data processing unit 20 and stored in the local memory unit 40 in said stop information unit. This redundancy increases the fail safety of the overall system. Furthermore, there is an improvement in the speed for querying timetable information.

In the present example, it will be assumed that the user 28 is in the region of the underground railway stop 34c/36c with his smartphone 30. Owing to this location, the connection of the smartphone 30 to the global satellite navigation system 26 and/or to the mobile radio network 24 is unavailable or at least severely disrupted. If the user 28 starts the app on the smartphone 30 in order to retrieve timetable information, the smartphone 30 sets up a near field communication link to the NFC unit 42 on account of the restricted reception conditions. On account of the characteristics of near field communication (short range), the location of the smartphone 30 is therefore known at the same time. The stop information unit 38 ascertains the timetable information for the underground trains U34, U36 from the local memory unit 40 and transmits said information to the smartphone 30 using the near field communication link. The user 28 therefore receives the arrival times, departure times, terminal stops and/or line designations of the underground trains U34, U36, for example.

Figure 2:
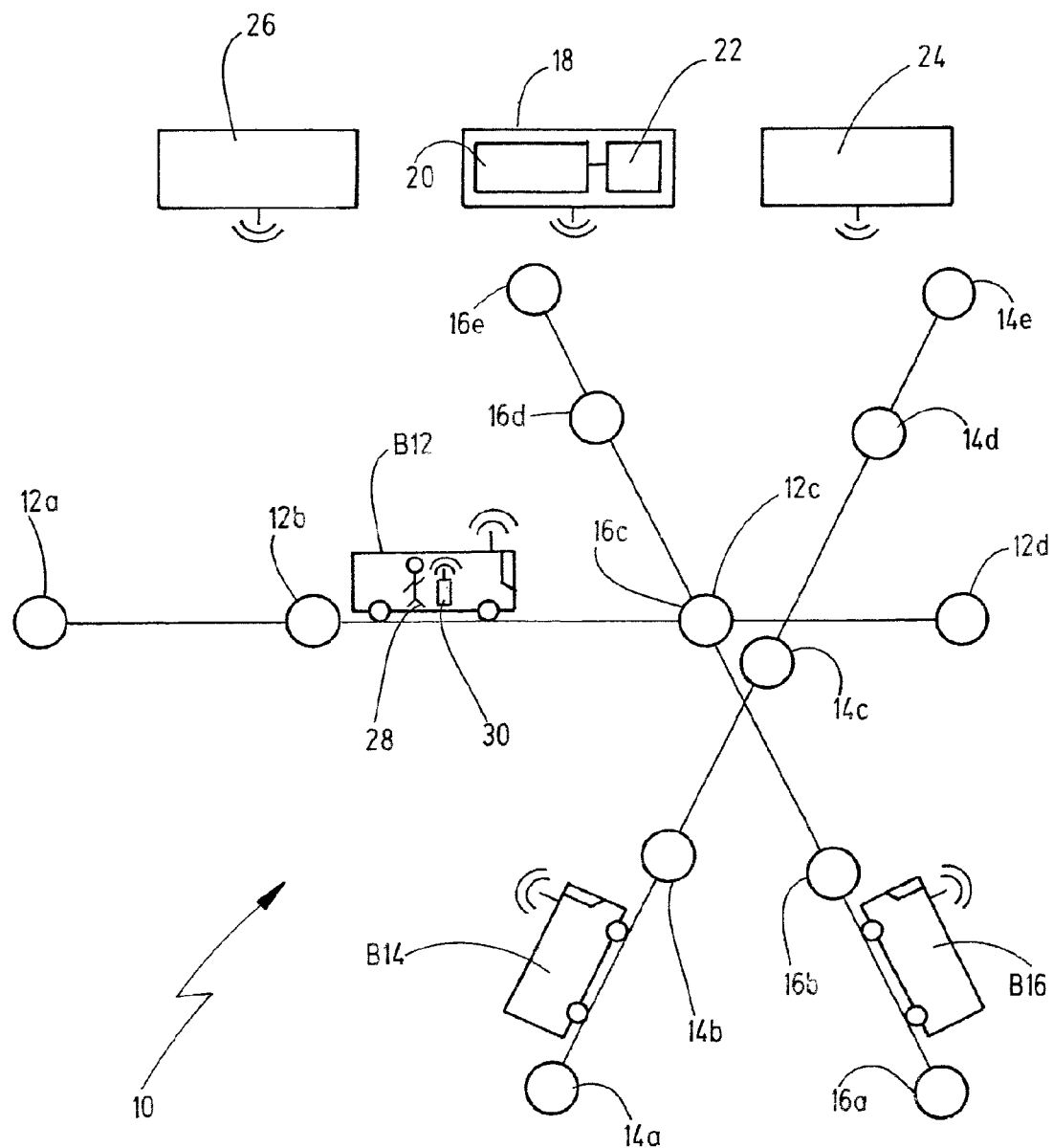
FIG. 2 shows the transport network in order to explain a further embodiment of the method according to the invention.

In a similar manner to the exemplary embodiments in FIGS. 1 and 2, the timetable information can be transmitted to the smartphone 30 on the basis of the push principle in the present example too. To this end, the user 28 uses his smartphone 30 to register with the timetable information service of the control center 18. As soon as the user 28 approaches an NFC unit 42 with the smartphone 30, the smartphone 30 is located and the appropriate timetable information is automatically transmitted to the smartphone 30 and output thereon.

Furthermore, the smartphone 30 can be operated in what is known as an offline mode. The offline mode allows timetable information to be queried in the event of none or just some of the communication infrastructure components (global satellite navigation system 26, control center 18, mobile radio network 24, stop information unit 38) being available. To this end, the timetable information is transmitted to the smartphone 30 and stored in a local memory of the smartphone 30, so long as there is a connection from the mobile radio network 34 to the smartphone 30, for example. If the user 28 is subsequently in an underground railway tunnel with his smartphone 30, near field communication or else other technologies, such as WLAN or Bluetooth, can be used to determine just the location of the smartphone 30. The ascertained location information is then compared with the locally stored timetable information. Finally, the departure times, arrival times, etc. of the underground trains U34, U36 at the closest stop 34c/36c are output on the smartphone 30. In a further alternative embodiment, the location determination can also be effected by virtue of the stop name being input into the smartphone 30. Hence, in this embodiment, there is no need for a connection to one of the communication infrastructure components.

The timetable information for the offline mode can be transmitted to the smartphone 30 or to the local memory of the smartphone 30 in this case either at the request of the user 28 or else at fixed intervals of time.

Figure 4:
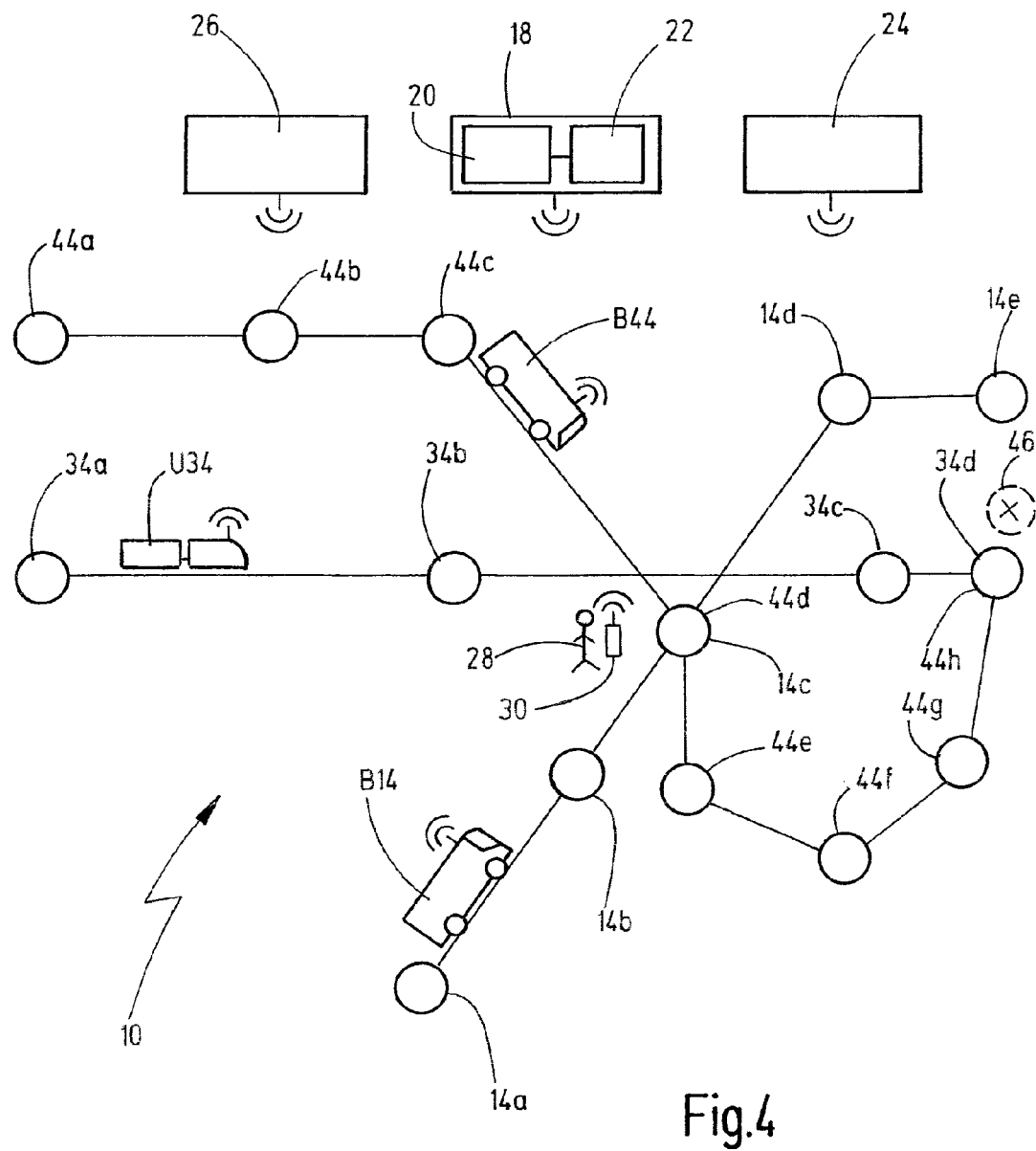
FIG. 4 shows the transport network in order to explain a further embodiment of the method according to the invention.

FIG. 4 shows the transport network 10 in order to explain a further embodiment of the method. The same elements in relation to the preceding figures are denoted by the same reference symbols. The differences are essentially explained below.

The transport network 10 from FIG. 4 additionally has a bus route along stops 44a to 44h that a bus B44 uses. The communication between the bus B44 and the control center 18 is effected in the same way as the communication of the other scheduled means of transport and will therefore not be explained in more detail below.

In this example, it will be assumed that the user 28 together with the smartphone 30 moves in a region of the transport network 10 and wishes to get to a destination 46. To this end, the user 28 starts the app on the smartphone 30. By way of example, the user 28 then inputs the name or the coordinates of the destination 46 into the smartphone 30. The smartphone 30 then uses the global satellite navigation system 26 to ascertain the current location. This location information is transmitted together with the input destination 46 to the control center 18 via the mobile radio network 24. The data processing unit 20 takes the location information, the destination 46 and the timetable information stored in the central memory 22 as a basis for computing one or more alternative routes of travel to the destination 46. Furthermore, the smartphone 30 can transmit the maximum distance 32 (capture radius) defined by the user 28 to the control center 18, which maximum distance narrows down the selection of the routes of travel.

In the present example, it will be assumed that the stops 14c/44d and 34b are within the defined capture radius. Hence, the user 28 has essentially three options for getting to the destination 46. On the basis of a first option, the user 28 can first of all take a relatively long walk to the underground railway stop 34b so as then to use the fast underground train service U34 to travel to the stop 34d that is in the direct vicinity of the destination 46. On the basis of a second option, the user 28 can take a short walk to the stop 14c and then travel to the stop 14e on the bus B14. However, the bus B14 departs from the stop 14c later than the underground train U14 departs from the stop 34b. Furthermore, the terminal stop 14e is further away from the destination 46, which means that a relatively long walk is required from that stop. A third alternative option that arises is to travel on the bus B44, which goes to the nearby stop 44d. It is advantageous that the bus B44 travels as far as the stop 44h, which is likewise in direct proximity to the destination 46. However, a disadvantage is the many intermediate stops 44e, 44f, 44g that it is necessary to travel through before reaching the terminal stop 44h.

These alternative routes of travel computed by the data processing unit 20 are transmitted to the smartphone 30 via the mobile radio network 24. In addition, any interchange advice that may be required for the computed routes of travel can also be transmitted to the smartphone 30.

The routes of travel are then output together with the scheduled arrival time of the destination 46 on the smartphone. On the basis of this information, the user 28 can select the route of travel that is suitable for him.

In an alternative embodiment, the user 28 can set particular preferences for the itinerary (fast route, exclusive use of underground trains, short walk, inexpensive route of travel, etc.) in the smartphone 30 in advance. Depending on these preferences, the app can select or propose an optimum route of travel already.

Although preferred embodiments of the method according to the invention have thus been shown, it goes without saying that various alterations and modifications can be made without departing from the scope of the invention.

By way of example, the method can be used for any scheduled means of transport (buses, underground trains, trams, overground trains, etc.).

Furthermore, the terminal-based or network-based locating of the smartphone 30 can be combined with the pull principle or push principle described as desired.

Instead of the smartphone 30, it is also possible to use other types of portable appliances such as laptops, PDAs or tablet computers.

By way of example, the mobile radio network 24 described may be a GSM network, a UMTS network or an LTE network.

The invention claimed is:

1. A method for conditioning and displaying timetable information in a transport network that has a plurality of stops for scheduled means of transport, having the steps of:
   sensing of the approach of a portable appliance to a stop on the basis of position-dependent data from the portable appliance;
   ascertainment of at least one future departure time of a scheduled means of transport at the stop; and
   output of the at least one future departure time on the portable appliance, wherein the ascertainment of the at least one future departure time and the output of the at least one future departure time on the portable appliance are effected automatically as soon as the approach of the portable appliance to the stop is sensed.

2. The method as claimed in claim 1, having the steps of:
   sensing the portable appliance on a scheduled means of transport on the basis of the position-dependent data from the portable appliance;
   ascertainment of at least one connection to another scheduled means of transport at the stop that the portable appliance is approaching; and
   output of the connection on the portable appliance.

3. The method as claimed in claim 2, wherein the ascertainment of the at least one connection and the output of the connection on the portable appliance are effected automatically as soon as the portable appliance on the scheduled means of transport is sensed.

4. The method as claimed in claim 1, wherein the sensing of the approach of the portable appliance to the stop is effected on the portable appliance.

5. The method as claimed in claim 4, wherein the ascertainment of the at least one future departure time is started by means of the portable appliance.

6. The method as claimed in claim 2, wherein the sensing of the portable appliance on the scheduled means of transport is effected on the portable appliance.

7. The method as claimed in claim 6, wherein the ascertainment of the at least one connection is started by means of the portable appliance.

8. The method as claimed in claim 1, wherein the sensing of the approach of the portable appliance to the stop is effected on a data processing unit from which position data from at least one portion of the transport network are accessible.

9. The method as claimed in claim 8, wherein the ascertainment of the at least one future departure time is started by the data processing unit.

10. The method as claimed in claim 8, wherein the portable appliance is registered on the data processing unit.

11. The method as claimed in claim 2, wherein the sensing of the portable appliance on the scheduled means of transport is effected on a data processing unit from which position data from at least one portion of the transport network are accessible.

12. The method as claimed in claim 11, wherein the ascertainment of the at least one connection is started by the data processing unit.

13. The method as claimed in claim 11, wherein the portable appliance is registered on the data processing unit.

14. The method as claimed in claim 1, wherein the approach of the portable appliance to the stop is sensed as soon as there is less than a defined maximum distance between the portable appliance and the stop.

15. The method as claimed in claim 1, having the steps of:
   input of a destination into the portable appliance;

ascertainment of itinerary data that have at least one of the following elements:
interchange advice;
name of a destination stop;
scheduled arrival time at the destination stop; and
output of the itinerary data on the portable appliance.

16. The method as claimed in claim 1, wherein the portable appliance uses a wireless network to access timetable information that is at least one of stored at least to some extent in a central memory unit and stored at least to some extent in a plurality of local memory units.

17. The method as claimed in claim 1, wherein the portable appliance is used to store timetable information with the departure times of at least one scheduled means of transport at a plurality of stops.

18. The method as claimed in claim 1, wherein the position-dependent data from the portable appliance are ascertained by at least one of using a transport-network specific positioning system, using a global satellite navigation system and using a mobile radio network.

19. The method as claimed in claim 1, wherein the position-dependent data from the portable appliance are ascertained using near field communication.

20. The method as claimed in claim 1, wherein timetable information is transmitted to the portable appliance using a near field communication.

* * * * *